March 17, 1953    R. H. LONG ET AL    2,631,700
CLUTCH CONTROL MECHANISM
Filed May 21, 1949    2 SHEETS—SHEET 1

INVENTORS
RICHARD H. LONG
BY EDWIN E. PRATHER
J. O. Clayton
ATTORNEY

March 17, 1953  R. H. LONG ET AL  2,631,700
CLUTCH CONTROL MECHANISM
Filed May 21, 1949  2 SHEETS—SHEET 2
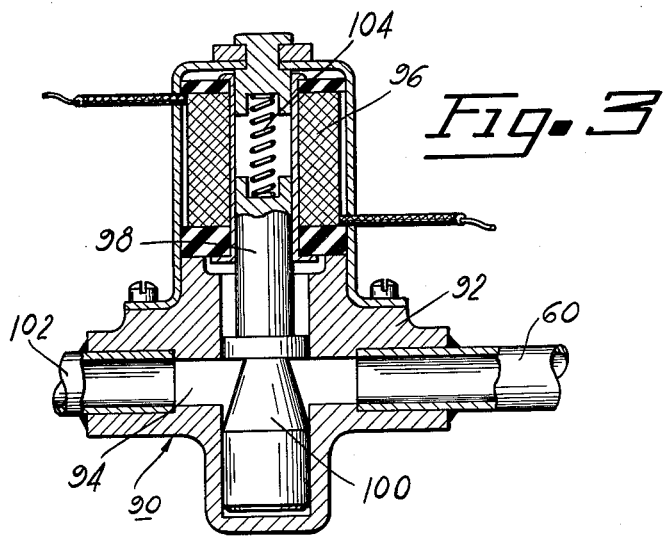
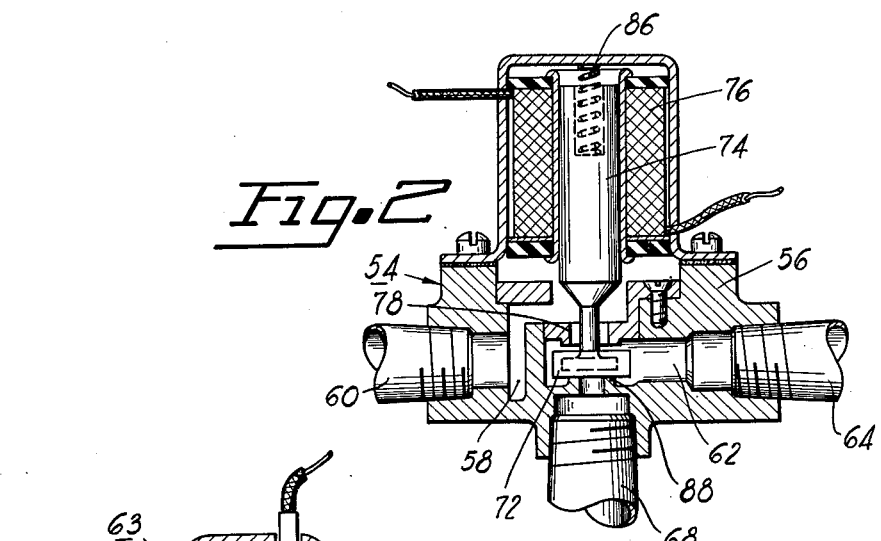
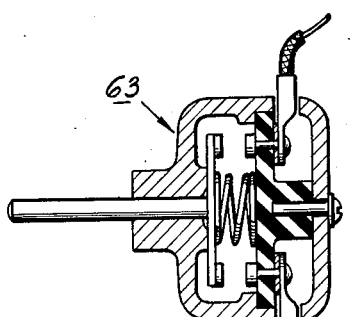
INVENTORS
RICHARD H. LONG
BY EDWIN E. PRATHER
H. O. Clayton
ATTORNEY Patented Mar. 17, 1953

2,631,700

UNITED STATES PATENT OFFICE 2,631,700

CLUTCH CONTROL MECHANISM

Richard H. Long and Edwin E. Prather, South Bend, Ind., assignors to Bendix Aviation Corporation, South Bend, Ind., a corporation of Delaware Application May 21, 1949, Serial No. 94,566

4 Claims. (Cl. 192—.09)

This invention relates in general to power plants and more particularly to power plants adapted for use in the automotive vehicle of the day.

It is an object of our invention to provide an automotive power plant including a mechanism constructed and arranged and so operative that there is required of the driver but a minimum of effort in the operation of the parts of the mechanism.

Yet another object of our invention is to provide an automotive power plant including an internal combustion engine, a fluid coupling, a friction clutch, a clutch pedal, an accelerator, a change speed transmission mechanism comprising a shift lever, and a propeller shaft, the operation of the plant being controlled by an operation of the accelerator, the clutch pedal, and the gear shift lever.

A further object of our invention is to provide a simple and easily serviced power plant adapted for use in an automotive vehicle said plant including, in combination with a friction clutch, a fluid coupling, a change speed transmission, and a propeller shaft connected to the transmission, means, including a manually operated clutch pedal and a pressure differential operated motor, for operating the clutch to facilitate an operation of the transmission, and further including a power operated brake for preventing a rotation of the propeller shaft after the car is brought to a standstill with the transmission in gear.

A further object of our invention to provide, in an automotive power plant comprising a fluid coupling, a friction clutch, and a three speeds forward and reverse transmission, power means operative, with the vehicle in motion above a certain speed, to operate the clutch and thereby facilitate an operation of the transmission and also operative, when the vehicle is to a stop, to prevent a creeping of the vehicle resulting from an operation of the fluid coupling.

Our invention further contemplates the provision of a power plant including, in series, an internal combustion engine or equivalent prime mover, a three speeds forward and reverse transmission, a propeller shaft connected to the transmission, a fluid coupling, and a friction clutch, the operation of the clutch and propeller shaft being controlled by power means whereby the operation of the transmission is facilitated by an operation of the clutch and the rotation of the shaft is impeded to prevent a creep of the vehicle normally caused by the operation of the fluid coupling.

The above and other objects and features of the invention will appear more fully hereinafter from a consideration of the following description taken in connection with the accompanying drawings wherein one embodiment of the invention is illustrated by way of example.

Figure 2 is a sectional view disclosing details of the solenoid operated three-way valve for controlling the clutch and brake operating motors of our invention;

Figure 3 is a sectional view disclosing details of the solenoid operated air bleed valve of the controls for the clutch operating motor of our invention; and Figure 4 is a sectional view disclosing details of the switch mechanism constituting one of the controls for the clutch operating motor of our invention.

Figure 1:
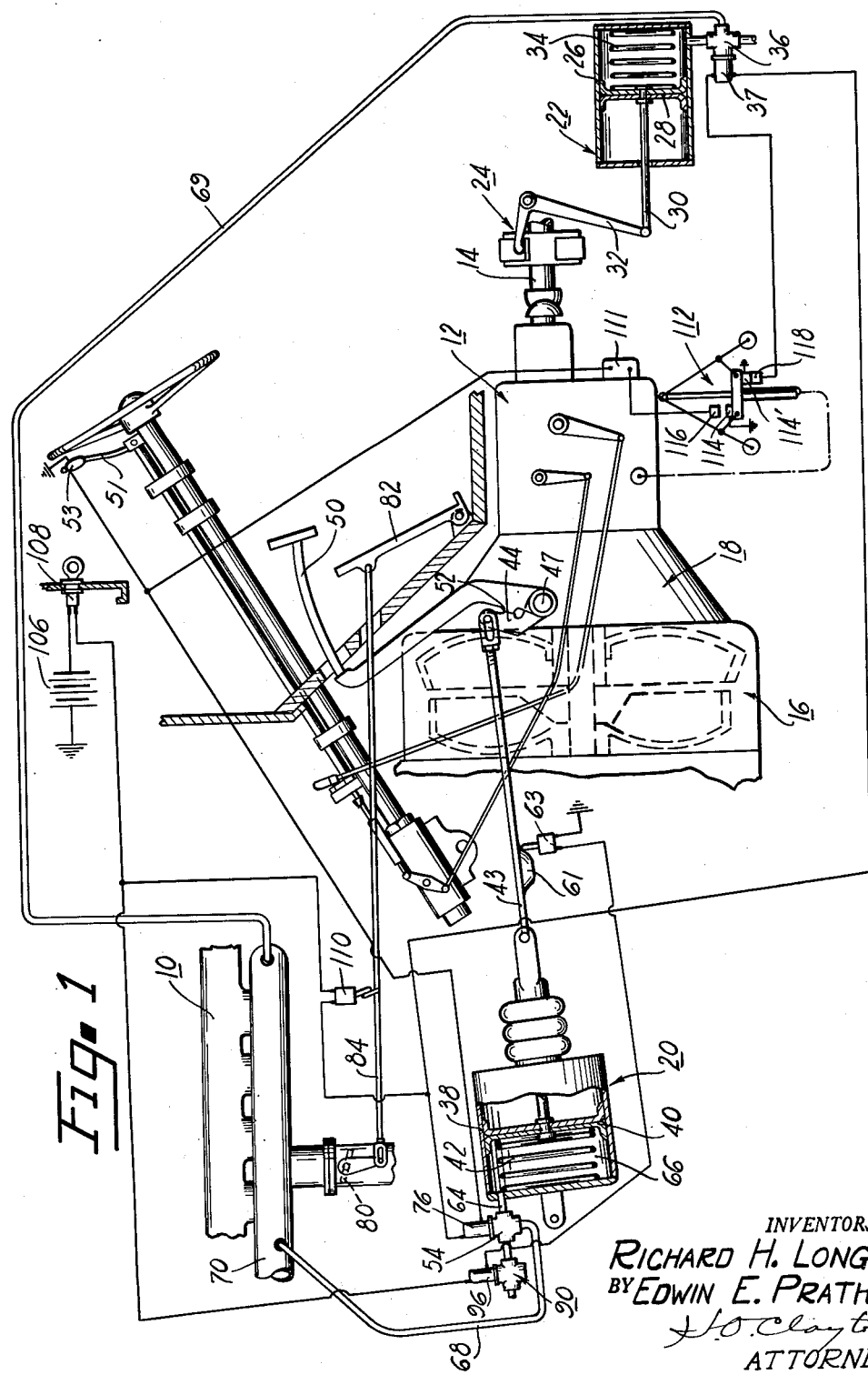
Figure 1 is a schematic view disclosing the controls of the power plant constituting our invention.

There is disclosed in Figure 1 a preferred embodiment of the power plant constituting our invention the principal elements including an internal combustion engine 10 of any conventional design, a change speed transmission 12, a propeller shaft 14 connected at one of its ends to the transmission and adapted to be connected at its other end to a differential mechanism, not shown, a fluid coupling 16, a friction clutch 18, and power means for operating the clutch and controlling the operation of the propeller shaft. The coupling and clutch, which are of conventional design, constitute a part of the force transmitting means interconnecting the engine and transmission.

The fluid coupling 16 of the power plant may be supplanted by a centrifugal clutch mechanism or any other equivalent of the coupling; and the transmission unit 12 is preferably of the three-speeds forward and reverse type, however, any other selective type of step transmission mechanism may be employed in lieu thereof.

The power means for operating the friction clutch and controlling the operation of the propeller shaft constitutes the most important feature of our invention and includes a pressure differential operated motor 20 for operating the clutch and a pressure differential operated motor 22 for operating a brake mechanism 24. The latter mechanism is preferably of the band type and is operably secured to the propeller shaft 14 of the power plant. The motor 22, preferably vacuum operated and including a casing 26 and a piston 28, is conveniently mounted on the chassis of the vehicle adjacent the brake 24; and said piston may be connected to the brake by a link 30 and a bell crank 32. When the motor 22 is de-energized the brake is released by a return spring 34; and completing the description of the brake operating mechanism the motor 22 is preferably controlled by a spring and solenoid operated three-way valve 36 described hereinafter. The solenoid for operating the valve 36 is indicated by the reference numeral 37.

Describing the clutch operating part of the power means of our invention the pressure differential operated motor 20, which may be a duplicate of the motor 22, is preferably of the vacuum type and includes a casing 38 and a piston 40 the latter being returned to its released, that is clutch engaged position, by a spring 42. The piston 40 is connected to the clutch 18 by force transmitting means including a rod 43, a crank 44, and a shaft 47. Movement of the piston 40 to the left, Figure 1, when the motor is energized, results in a rotation of the crank 44 to disengage the clutch; and the clutch may also be disengaged by the operation of a manually operated clutch pedal 50, a stop 52 on said pedal contacting the crank 44 in this operation.

The clutch operating motor 20 is controlled by valvular mechanism including a spring and solenoid operating three-way valve 54 which is a duplicate of the aforementioned valve 36. The valve 54 is disclosed in detail in Figure 2 and includes a casing 56 comprising a compartment 58 communicating with a conduit 60 vented to the atmosphere. The valve is also provided with a compartment 62 which communicates with a conduit 64 interconnecting the valve with a compartment 66 of the motor 20; and a conduit 68 interconnects the valve with the intake manifold 70 of the internal combustion engine 10. The latter conduit provides a convenient means to supply vacuum to the brake operating motor 22 the connection with the valve 36 of the latter including a conduit 69. The valve mechanism also includes a valve member 72 mounted on the end of an armature 74 of a solenoid 76 mounted on the casing 56. When the solenoid is energized the valve member 72 is drawn upwardly, Figure 3, to seat upon a seat 78 thereby cutting off the connection between the motor compartment 66 and the atmosphere and interconnecting said compartment with the intake manifold 70. The manifold constitutes a source of vacuum when the engine 10 is idling, an accelerator operated throttle valve 80 being then in its closed position. An accelerator 82 is connected to the throttle valve by force transmitting means indicated by the reference numeral 84. When the solenoid 76 is de-energized a spring 86 expands to seat the valve member 72 upon a seat 88 thereby cutting off the connection between the manifold and the motor compartment 66 and connecting said compartment with the atmosphere via the valve compartment 58 and the conduit 60.

The latter conduit is connected to a bleed valve 90, Figure 3, which includes a casing 92 bored to provide an air transmitting duct 94. A solenoid 96 mounted on the valve casing, includes an armature 98 to which is secured a bleed valve member 100 shaped to control the volume of air flowing, via a vent connection 102, into and through the valve to the conduit 60. The solenoid 96 is energized when the piston 40 reaches a certain position in its clutch engaging movement; and this operation of the solenoid results in an upward movement of the valve, Figure 3, to throttle, that is reduce the rate of flow of air into the clutch motor 20. When the solenoid 96 is de-energized a spring 104 serves to move the valve member 100 downwardly to the position disclosed in Figure 3, to open the vent connection between the atmosphere and the clutch motor.

Describing now the electrical controls for controlling the operation of the clutch and brake operating motors 20 and 22, the clutch motor controlling solenoid 76 is preferably controlled by a grounded battery 106, a cut off switch 108, preferably the ignition switch of the car, which may be mounted in the instrument panel of the driver's compartment, an accelerator operated breaker switch 110, a breaker switch 111 which is opened by the transmission 12 when the same is established in its high gear setting, and a switch 114, 116 of a grounded vehicle speed responsive governor operated switch 112, Figure 1. These electrical controls are preferably electrically connected in series as is disclosed in Figure 1. Switch 112, preferably of the escapement type, includes grounded movable contacts 114 and 114' and fixed contacts 116 and 118; and this switch may be of the single pole double throw type.

The brake operating motor 22 is controlled by the aforementioned valve mechanism 36 which duplicates the valve mechanism 54; and the solenoid 37 which actuates the valve 36 is controlled by the battery 106, the ignition switch 108, the accelerator operated switch 110, and a switch 114', 118 of the governor operated switch mechanism 112. The ignition switch 108, the transmission operated switch 111 and the accelerator operated switch 110 are breaker switches of any well known design accordingly said switches are not disclosed in detail. As to the governor operated switch 112 this is also of standard design and is not disclosed in detail in the drawings. As to the operation of the governor operated switch the mechanism is such that the clutch controlling switch 114, 116 may be closed when the speed of the vehicle reaches say one tenth of a mile per hour; and the brake motor controlling switch 114', 118 may be closed when the vehicle is at a standstill or is traveling at a speed below said one tenth of a mile per hour. The transmission operated switch 111 is included in the controls to prevent a coasting of the vehicle when the accelerator is released, the vehicle at the time being established in its high gear setting and traveling above governor speed.

Describing now the complete operation of our invention and incidentally completing the description of the parts thereof, when the car is at a standstill and the engine is idling to make of the intake manifold a source of vacuum the brake operating motor 22 is energized to apply the brake 24 thereby preventing a rotation of the propeller shaft 14. As to the need for the power brake in the mechanism of our invention if the driver leaves the transmission in gear in bringing the vehicle to a stop, then the fluid coupling 16 would, in the absence of the brake 24, cause the car to creep; however, when the accelerator is released to close the switch 110 and the speed of the car is lowered sufficiently to effect a closing of the governor operated switch 114', 118, then the brake is automatically applied thereby preventing the car from creeping. The friction clutch is at the time engaged and the transmission may at the time be left in a relatively high gear inasmuch as the operation of the fluid coupling will prevent the engine from stalling.

In preparation for getting the vehicle under way the driver will then operate the transmission 12 to place the same in a desired relatively low gear setting; or he may, by virtue of the presence of the fluid coupling in the driving mechanism, leave the transmission in its then established setting. If the driver decides to operate the transmission to establish the same in a new setting he must first disengage the clutch, and this may be accomplished by depressing the clutch pedal 50; however, the mechanism of our invention may include another control for the clutch operating pressure differential operated motor 20 said control being mounted on a gear shift lever 51. Referring to Figure 1 there is disclosed a grounded breaker switch 53 conveniently mounted on the shift lever said switch being wired to the electrical connection between the transmission operated breaker switch 111 and the solenoid 76. It is apparent therefore that the switch 53 is electrically connected in parallel with the governor operated switch 114, 116 and the switch 53 thereby providing means for effecting a power disengagement of the friction clutch when the vehicle is at a standstill and said governor operated switch is open. The switch 53, which is preferably of the conventional breaker type such as the accelerator operated switch 110, may be operated by the finger of the driver by the pressing of a button; or this switch may be so connected to the gear shift lever that the switch is closed when said lever is subjected to a slight pressure; then when the driver removes his hand from the lever the switch is automatically opened. The clutch pedal 50 is preferably used to disengage the clutch when the engine is dead and the transmission is in gear, the car at the time being at a standstill.

To get the vehicle under way the driver will then depress the accelerator thereby speeding up the engine the clutch at the time being engaged; and this operation also serves to open the accelerator operated switch 110 thereby effecting a release of the brake 24. The car being under way the driver will then probably desire to operate the transmission to establish the same in a relatively high gear ratio setting; and to effect this operation the clutch must first be disengaged. With the mechanism of our invention this operation is accomplished merely by releasing the accelerator; for the governor operated switch 114, 116 is at the time closed and the release of the accelerator closes the switch 110 thereby effecting an energization of the motor 20 to disengage the clutch. Then after the operation of the transmission is completed the accelerator is depressed to speed up the engine and effect a re-engagement of the clutch by an opening of the switch 110. Explaining the engagement of the clutch the clutch engaging movement of the piston 40 is effected in two stages by virtue of the operation of the bleed valve 90, Figure 4. Explaining the operation of this valve and the controls therefor, the valve member 100 is, by virtue of the operation of the spring 104, normally in the position disclosed in Figure 3 to permit a relatively rapid flow of air into the compartment 66 of the motor 20; but when the motor piston 40 has moved to a point where the plates of the clutch are just about to engage then a cam 61 mounted to the rod 42, operates to close a grounded switch 63, Figure 4, thereby energizing the solenoid 96. As will be apparent from an inspection of Figure 3 the latter operation serves to draw the valve member 100 upwardly thereby throttling the ingress of air into the motor 20; and this operation effects a relatively slow clutch engaging movement of the clutch plates. The bleed valve operating solenoid 96 is wired to the grounded battery 106 accordingly the electrical circuit for controlling the solenoid includes the battery 106, the solenoid 96, and the grounded switch 63.

There is thus provided, by the power plant of our invention, a simple mechanism for effecting a smooth and substantially effortless operation of the vehicle. The accelerator 82 and the gear shift lever 51 are the principal controls of the mechanism and both require but a minimum of operation. With the fluid coupling 16 included in the power plant of our invention the transmission may be left in a relatively high gear ratio setting when the vehicle is brought to a stop the power brake mechanism then automatically coming into operation to prevent a creeping of the vehicle, the clutch being at the time engaged. The friction clutch 18, in cooperation with the fluid coupling, then facilitates a quick getaway of the vehicle when the driver decides to place the vehicle in motion. The driver may then operate the transmission merely by releasing the accelerator and operating the gear shift lever the former operation serving to disengage the clutch to facilitate the operation of the transmission; or a coasting operation of the vehicle may be effected, except when the transmission is established in its high gear setting, merely by releasing the accelerator thereby disengaging the clutch.

With the preferred embodiment of our invention disclosed in Figure 1 of the drawings the clutch may be disengaged, when the vehicle is at a standstill, by either manually depressing the clutch pedal or by closing the switch 53 mounted in the gear shift lever; and with this mechanism an opening of the latter switch or an opening of the accelerator operated switch, initiates a stage, that is smooth engagement of the clutch.

Although only one embodiment of the invention has been illustrated and described, various changes in the form and relative arrangements of the parts may be made to suit requirements.

I claim:

1. In an automotive vehicle provided with an internal combustion engine, an accelerator, a fluid coupling, a clutch, a change gear transmission adapted to be established in any one of a plurality of settings including a high gear setting, means interconnecting the engine, fluid coupling, clutch and transmission, and driven means drivably connected to the transmission and adapted to drive the vehicle; means for automatically disengaging the clutch when the vehicle is in motion at or above a certain speed, the accelerator is released and the transmission is established in any one of a plurality of settings except its high gear setting, and for automatically braking the driven means when the accelerator is released and the vehicle is travelling below a certain speed or is at rest, said means including a brake mechanism adapted to be applied to the driven means, a fluid pressure operated motor operably connected to the clutch, a fluid pressure operated motor operably connected to the brake mechanism, valve means for controlling the operation of the clutch operating motor, valve means for controlling the operation of the brake operating motor, means, operable by virtue of the operation of the accelerator and transmission and by virtue of the speed of the vehicle or lack of speed of the vehicle, for controlling the operation of the first mentioned valve means, and means, including a portion of the aforementioned valve control means, operable when the vehicle is at a stop or is traveling below a certain speed and by virtue of the operation of the accelerator, for controlling the operation of the second mentioned valve means.

2. In an automotive vehicle provided with an internal combustion engine, a fluid coupling, a clutch, a three speeds forward and reverse transmission, means interconnecting the engine, fluid coupling, clutch and transmission, and driven means drivably connected to the transmission and adapted to propel the vehicle forwardly; means for automatically operating the clutch depending upon an operation of the accelerator and the transmission and upon the speed of the vehicle and for automatically braking the driven means when the accelerator is released and the vehicle is traveling below a certain speed or is at rest, said means including a brake mechanism adapted to be applied to the driven means, a fluid pressure operated motor operably connected to the clutch, a fluid pressure motor operably connected to the brake mechanism, valve means for controlling the operation of the clutch operating motor, valve means for controlling the operation of the brake operating motor, means, operable by virtue of an operation of the accelerator, by virtue of the speed of the vehicle or when the vehicle is at rest, and by virtue of an operation of the transmission, for controlling the operation of the first mentioned valve means, the valve means being operated to effect a clutch engaging operation of the clutch operating motor when the transmission is shifted from any one of its settings to its high gear setting, and means, including a portion of the aforementioned valve control means, operable when the vehicle is at a stop or is traveling below a certain speed and by virtue of a release of the accelerator, for controlling the operation of the second mentioned valve means.

3. In an automotive vericle provided with an internal combustion engine, an accelerator, a fluid coupling, a clutch, a change gear transmission, means interconnecting the engine, fluid coupling, clutch and transmission, and driven means drivably connected to the transmission and adapted to propel the vehicle forwardly; power means for automatically operating the clutch depending upon an operation of the accelerator and the transmission and upon the speed of the vehicle and for automatically braking the driven means when the accelerator is released and the vehicle is traveling below a certain speed or is at rest, said power means including a brake mechanism adapted to be applied to the driven means, a fluid pressure operated motor operably connected to the clutch, a fluid pressure operated motor operably connected to the brake mechanism, valve means for controlling the operation of the clutch operating motor, valve means for controlling the operation of the brake operating motor, means, including, in series, a source of electricity, and accelerator operated switch, a switch operated by the transmission, and a vehicle speed responsive governor operated switch, operable, depending upon the speed of the vehicle and by virtue of an operation of the accelerator and transmission, for controlling the operation of the first mentioned valve means, and means, including the aforementioned accelerator operated switch together with another vehicle speed responsive governor operated switch, operable when the vehicle is at a stop or is traveling below a certain speed and by virtue of an operation of the accelerator, for controlling the operation of the second mentioned valve means.

4. In an automobile provided with an internal combustion engine, an accelerator, a fluid coupling, a clutch, a three-speeds forward and reverse transmission, means interconnecting the engine, fluid coupling, clutch and transmission, and driven means drivably connected to the transmission, and adapted to drive the vehicle; power means for automatically operating the clutch and for automatically braking the driven means when the accelerator is released and the vehicle is either traveling below a certain speed or is at rest, said power means including a brake mechanism adapted to be applied to said driven means, a fluid pressure operated motor operably connected to the clutch, a fluid pressure operated motor operably connected to the brake mechanism, valve means for controlling the operation of the clutch operating motor, valve means for controlling the operation of the brake operating motor, means, including, in series, a source of electricity, an accelerator operated switch, a switch operated by the transmission, and a vehicle speed responsive governor operated switch, operable when the vehicle is in motion above a certain speed, and by virtue of the operation of the accelerator, and by virtue of an operation of the transmission for controlling the operation of the first mentioned valve means, and means, including the aforementioned accelerator operated switch, and another vehicle speed responsive governor operated switch, operable, when the vehicle is at a stop or is traveling below a certain speed and by virtue of an operation of the accelerator, to control the operation of the second mentioned valve means.

RICHARD H. LONG.
EDWIN E. PRATHER.

REFERENCES CITED

The following references are of record in the file of this patent:

UNITED STATES PATENTS

| Number | Name | Date |
|---|---|---|
| 2,247,714 | Peterson et al. | July 1, 1941 |
| 2,410,333 | Barkeij | Oct. 29, 1946 |
| 2,455,943 | Neracher et al. | Dec. 14, 1948 |
| 2,479,183 | Peterson et al. | Aug. 16, 1949 |